United States Patent
Watanabe

(10) Patent No.: US 10,685,571 B2
(45) Date of Patent: Jun. 16, 2020

(54) VEHICLE DISPATCH SYSTEM, AUTONOMOUS DRIVING VEHICLE, AND VEHICLE DISPATCH METHOD

(71) Applicant: TOYOTA JIDOSHA KABUSHIKI KAISHA, Toyota-shi, Aichi-ken (JP)

(72) Inventor: Junya Watanabe, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/122,178

(22) Filed: Sep. 5, 2018

(65) Prior Publication Data
US 2019/0108757 A1   Apr. 11, 2019

(30) Foreign Application Priority Data
Oct. 10, 2017 (JP) ................... 2017-197070

(51) Int. Cl.
*G08G 1/00* (2006.01)
*G06T 11/00* (2006.01)
(Continued)

(52) U.S. Cl.
CPC .............. *G08G 1/202* (2013.01); *G06T 11/00* (2013.01); *H04W 4/02* (2013.01); *H04W 4/023* (2013.01); *H04W 4/029* (2018.02)

(58) Field of Classification Search
CPC .......... G08G 1/202; G06T 11/00; H04W 4/02
See application file for complete search history.

(56) References Cited

U.S. PATENT DOCUMENTS

2011/0238302 A1* 9/2011 Lee .................. G01C 21/20
                                                                701/408
2014/0074393 A1  3/2014 Kojima et al.
(Continued)

FOREIGN PATENT DOCUMENTS

| JP | 2002-279588 A | 9/2002 |
| JP | 5589900 B2 | 9/2014 |

OTHER PUBLICATIONS

Office Action issued in corresponding U.S. Appl. No. 16/831,051 dated Apr. 16, 2020.
U.S. Appl. No. 16/831,051 filed Mar. 26, 2020.

*Primary Examiner* — Jacinta M Crawford
(74) *Attorney, Agent, or Firm* — Sughrue Mion, PLLC

(57) ABSTRACT

A vehicle dispatch system provides a vehicle dispatch service of an autonomous driving vehicle in response to a vehicle dispatch request from a user. The vehicle dispatch system includes a dispatch vehicle position estimation unit that estimates a dispatch vehicle position based on comparison of a surrounding environment recognition information, which is acquired by a sensor mounted in a dispatch vehicle, with a surrounding environment storage information, which is stored in advance, a user terminal position estimation unit configured to estimate a user terminal position, a surrounding image generation unit configured to generate a surrounding image of the dispatch vehicle based on the surrounding environment recognition information or the surrounding environment storage information, and a display processing unit configured to display a superimposed image having the dispatch vehicle position and the user terminal position superimposed on the surrounding image on a user terminal.

8 Claims, 12 Drawing Sheets

(51) Int. Cl.
 H04W 4/02 (2018.01)
 H04W 4/029 (2018.01)

(56) References Cited

U.S. PATENT DOCUMENTS

| | | |
|---|---|---|
| 2016/0370194 A1 | 12/2016 | Colijn et al. |
| 2017/0115125 A1 | 4/2017 | Outwater et al. |
| 2017/0153714 A1 | 6/2017 | Gao et al. |
| 2017/0336797 A1* | 11/2017 | Abe .................... G05D 1/0212 |
| 2018/0342157 A1 | 11/2018 | Donnelly et al. |
| 2018/0357898 A1* | 12/2018 | Kamini ................. G08G 1/127 |
| 2019/0072978 A1 | 3/2019 | Levi |

* cited by examiner

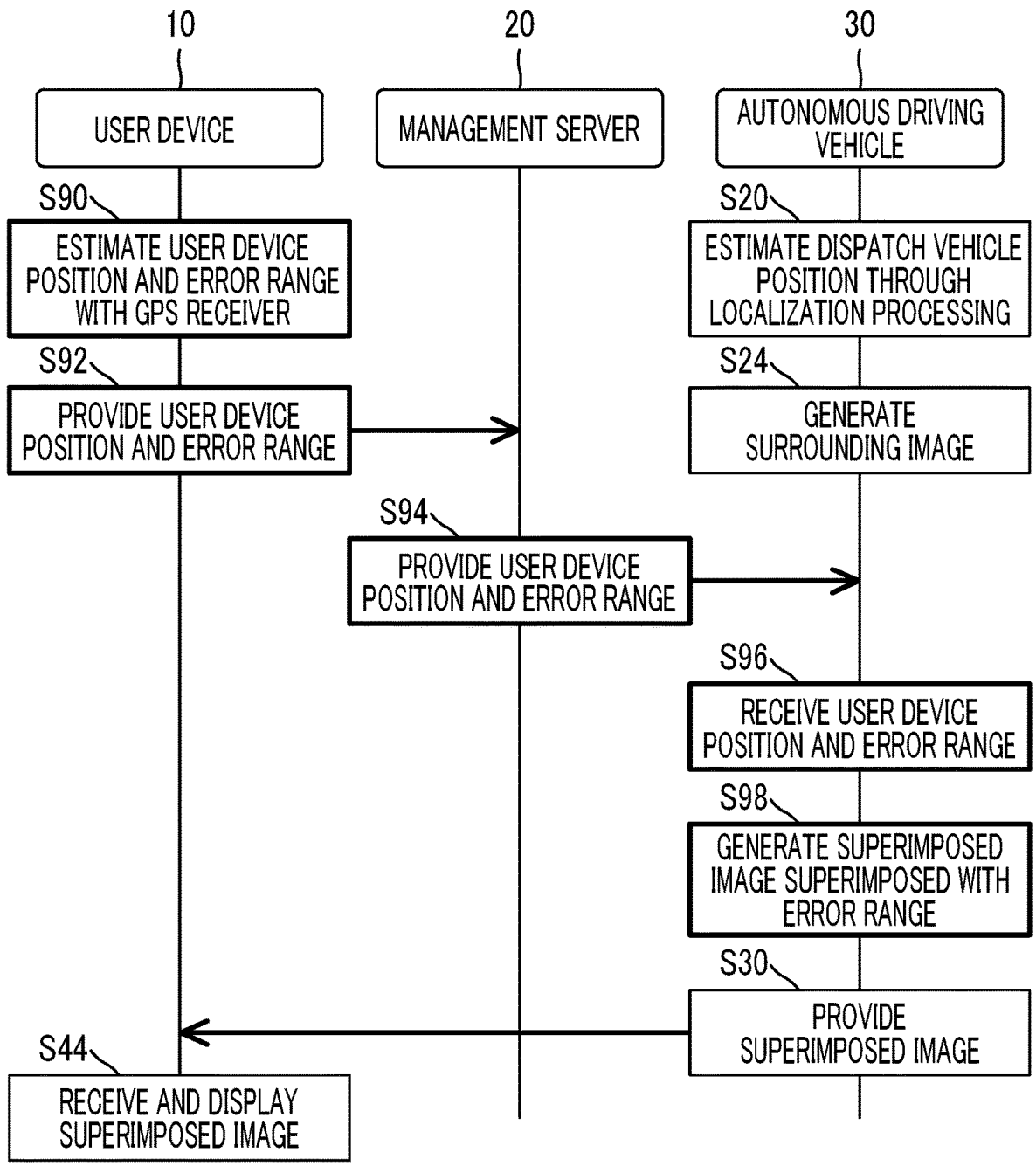

VEHICLE DISPATCH SYSTEM, AUTONOMOUS DRIVING VEHICLE, AND VEHICLE DISPATCH METHOD

INCORPORATION BY REFERENCE

The disclosure of Japanese Patent Application No. 2017-197070 filed on Oct. 10, 2017 including the specification, drawings and abstract is incorporated herein by reference in its entirety.

BACKGROUND

1. Technical Field

The present disclosure relates to a vehicle dispatch system for an autonomous driving vehicle, an autonomous driving vehicle, and a vehicle dispatch method, and in particular, to a vehicle dispatch system, an autonomous driving vehicle, and a vehicle dispatch method that provide a vehicle dispatch service of an autonomous driving vehicle in response to a vehicle dispatch request from a user.

2. Description of Related Art

US 2017/0153714 A discloses a technique for allowing an autonomous driving vehicle to specify an occupant candidate. Specifically, in the related art, an occupant candidate is specified based on a pickup position desired by a user included in a vehicle dispatch request from the user and vehicle sensor information. In a case where the occupant candidate is specified, the autonomous driving vehicle moves to a position where the occupant candidate can be picked up.

SUMMARY

As in US 2017/0153714 A, in a case where a vehicle dispatch service of an autonomous driving vehicle is provided, the following problem may occur. From the viewpoint of the user side, even though an dispatched vehicle approaches near the pickup position desired by the user, the user hardly specifies which vehicle is a dispatched vehicle dispatched to the user. As described above, in the vehicle dispatch service of an autonomous driving vehicle, it is desirable to construct a technique for allowing the user to easily specify a dispatch vehicle.

The present disclosure provides a vehicle dispatch system for an autonomous driving vehicle, an autonomous driving vehicle, and a vehicle dispatch method capable of allowing a user to easily specifying a dispatched vehicle.

A first aspect of the disclosure relates to a vehicle dispatch system for an autonomous driving vehicle that provides a vehicle dispatch service in response to a vehicle dispatch request from a user. The vehicle dispatch system includes a recognition information acquisition unit, a storage information acquisition unit, an dispatch vehicle position estimation unit, a user device position estimation unit, a surrounding image generation unit, a superimposed image generation unit, and an image display unit. The recognition information acquisition unit is configured to, by a sensor mounted in an dispatch vehicle, which is the autonomous driving vehicle to be dispatched, acquire surrounding environment recognition information, which is information of a surrounding environment of the dispatch vehicle. The storage information acquisition unit is configured to acquire surrounding environment storage information, which is information of the surrounding environment of the dispatch vehicle stored in advance. The dispatch vehicle position estimation unit is configured to estimate an dispatch vehicle position, which is a position of the dispatch vehicle, based on comparison of the surrounding environment recognition information with the surrounding environment storage information. The user device position estimation unit is configured to estimate a user device position, which is a position of a user device. The surrounding image generation unit is configured to generate a surrounding image representing the surrounding environment of the dispatch vehicle based on the surrounding environment recognition information or the surrounding environment storage information. The superimposed image generation unit is configured to generate a superimposed image having the dispatch vehicle position and the user device position superimposed on the surrounding image. The image display unit is configured to display the superimposed image on the user device.

The vehicle dispatch system according to the first aspect of the disclosure may further include a pedestrian position estimation unit configured to estimate a pedestrian position, which is a position of a pedestrian around the dispatch vehicle, based on the surrounding environment recognition information. The surrounding image generation unit may be configured to further superimpose the pedestrian position on the surrounding image.

The vehicle dispatch system according to the first aspect of the disclosure may further include a pedestrian position estimation unit configured to estimate a pedestrian position, which is a position of a pedestrian around the dispatch vehicle, based on the surrounding environment recognition information. The superimposed image generation unit may be configured to further superimpose the pedestrian position on the superimposed image.

The vehicle dispatch system according to the first aspect of the disclosure may further include a management server. The dispatch vehicle position estimation unit, the surrounding image generation unit, and the superimposed image generation unit may be mounted in the dispatch vehicle. The user device position estimation unit may be mounted in the user device. A communication device that is mounted in the dispatch vehicle may be configured to receive the user device position estimated by the user device position estimation unit through the management server and transmit the superimposed image generated by the superimposed image generation unit to the user device.

The vehicle dispatch system according to the first aspect of the disclosure may further include a management server. The dispatch vehicle position estimation unit and the surrounding image generation unit may be mounted in the dispatch vehicle. The user device position estimation unit may be mounted in the user device. The superimposed image generation unit may be mounted in the management server. The management server may be configured to receive the user device position estimated by the user device position estimation unit and the surrounding image generated by the surrounding image generation unit, and transmit the superimposed image generated by the superimposed image generation unit to the user device.

The vehicle dispatch system according to the first aspect of the disclosure may further include a management server. The surrounding image generation unit may be mounted in the dispatch vehicle. The user device position estimation unit may be mounted in the user device. The surrounding image generation unit and the superimposed image generation unit may be mounted in the management server. The management server may be configured to receive the user device position estimated by the user device position estimation unit and the surrounding image generated by the surrounding image generation unit, and transmit the superimposed image generated by the superimposed image generation unit to the user device.

The vehicle dispatch system according to the first aspect of the disclosure may further include an error range estimation unit configured to estimate an error range of the user device position. The superimposed image generation unit may be configured to further superimpose the error range on the superimposed image.

A second aspect of the disclosure relates to an autonomous driving vehicle that provides a vehicle dispatch service in response to a vehicle dispatch request from a user. The autonomous driving vehicle includes a recognition information acquisition unit, a storage information acquisition unit, an dispatch vehicle position estimation unit, a user device position reception unit, a surrounding image generation unit, a superimposed image generation unit, and an image transmission unit. The recognition information acquisition unit is configured to, by a sensor mounted in an dispatch vehicle, which is the autonomous driving vehicle to be dispatched, acquire surrounding environment recognition information, which is information of a surrounding environment of the dispatch vehicle. The storage information acquisition unit is configured to acquire surrounding environment storage information, which is information of the surrounding environment of the dispatch vehicle stored in advance. The dispatch vehicle position estimation unit is configured to estimate an dispatch vehicle position, which is a position of the dispatch vehicle, based on comparison of the surrounding environment recognition information with the surrounding environment storage information. The user device position reception unit is configured to receive a user device position, which is a position of a user device. The surrounding image generation unit is configured to generate a surrounding image representing the surrounding environment of the dispatch vehicle based on the surrounding environment recognition information or the surrounding environment storage information. The superimposed image generation unit is configured to generate a superimposed image having the dispatch vehicle position and the user device position superimposed on the surrounding image. The image transmission unit is configured to transmit the superimposed image to the user device.

The autonomous driving vehicle according to the second aspect of the disclosure may further include a pedestrian position estimation unit configured to estimate a pedestrian position, which is a position of a pedestrian around the dispatch vehicle, based on the surrounding environment recognition information. The surrounding image generation unit may be configured to further superimpose the pedestrian position on the surrounding image.

The autonomous driving vehicle according to the second aspect of the disclosure may further include a pedestrian position estimation unit configured to estimate a pedestrian position as a position of a pedestrian around the dispatch vehicle based on the surrounding environment recognition information. The superimposed image generation unit may be configured to further superimpose the pedestrian position on the superimposed image.

The autonomous driving vehicle according to the second aspect of the disclosure may further include an error range reception unit configured to receive an error range of the user device position. The superimposed image generation unit may be configured to further superimpose the error range on the superimposed image.

A third aspect of the disclosure relates to a vehicle dispatch method that is executed by a vehicle dispatch system for an autonomous driving vehicle providing a vehicle dispatch service in response to a vehicle dispatch request from a user. The vehicle dispatch method includes, by a sensor mounted in an dispatch vehicle, which is the autonomous driving vehicle to be dispatched, acquiring surrounding environment recognition information, which is information of a surrounding environment of the dispatch vehicle, acquiring surrounding environment storage information, which is information of the surrounding environment of the dispatch vehicle stored in advance, estimating an dispatch vehicle position, which is a position of the dispatch vehicle, based on comparison of the surrounding environment recognition information with the surrounding environment storage information, estimating a user device user device position, which is a position of a user device user device, generating a surrounding image representing the surrounding environment of the dispatch vehicle based on the surrounding environment recognition information or the surrounding environment storage information, generating a superimposed image having the dispatch vehicle position and the user device user device position superimposed on the surrounding image, and displaying the superimposed image on the user device user device.

With the vehicle dispatch system for an autonomous driving vehicle according to the first aspect of the disclosure and the vehicle dispatch method according to the third aspect of the disclosure, the dispatch vehicle position is estimated based on comparison of the surrounding environment recognition information with the surrounding environment storage information with high accuracy. With this, since the superimposed image having the accurate dispatch vehicle position and user device user device position superimposed on the surrounding image can be displayed on the user device user device, it is possible to allow the user to easily specify the dispatch vehicle position.

According to the first aspect of the disclosure, the pedestrian position around the dispatch vehicle is further superimposed on the surrounding image. With this, since the superimposed image further superimposed with the pedestrian position can be displayed on the user device user device, it is possible to more easily specify the dispatch vehicle based on the displayed pedestrian position.

According to the first aspect of the disclosure, the pedestrian position around the dispatch vehicle is further superimposed on the superimposed image. With this, it is possible to more easily specify the dispatch vehicle based on the displayed pedestrian position.

According to the first aspect of the disclosure, the error range of the user device user device position is further superimposed on the superimposed image. With this, even in a case where there is an error in the user device user device position, it is possible to ascertain the accurate user device position based on the error range and the surrounding image.

With the autonomous driving vehicle according to the second aspect of the disclosure, the dispatch vehicle position is estimated based on comparison of the surrounding environment recognition information with the surrounding environment storage information with high accuracy. With this, it is possible to transmit the superimposed image having the accurate dispatch vehicle position and user device position superimposed on the surrounding image to the user device.

According to the second aspect of the disclosure, the pedestrian position around the dispatch vehicle is further superimposed on the surrounding image. With this, since the superimposed image further superimposed with the pedestrian position can be transmitted to the user device, it is possible to ascertain the pedestrian position with the superimposed image on the user device side.

According to the second aspect of the disclosure, the pedestrian position around the dispatch vehicle is further superimposed on the superimposed image. With this, since the superimposed image further superimposed with the pedestrian position can be transmitted to the user device, it is possible to ascertain the pedestrian position with the superimposed image on the user device side.

According to the second aspect of the disclosure, the error range of the user device position is further superimposed on the superimposed image. With this, since the superimposed image further superimposed with the error range can be transmitted to the user device, it is possible to ascertain the error range of the user device position with the superimposed image on the user device side.

As described above, according to the aspects of the disclosure, it is possible to provide a vehicle dispatch system for an autonomous driving vehicle, an autonomous driving vehicle, and a vehicle dispatch method capable of allowing the user who carries the user device to easily specify the dispatch vehicle.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 15 is a diagram showing an example of a reception method of a user device position and an error range of the user device position in the autonomous driving vehicle of Embodiment 3.

DETAILED DESCRIPTION OF EMBODIMENTS

Figure 1:
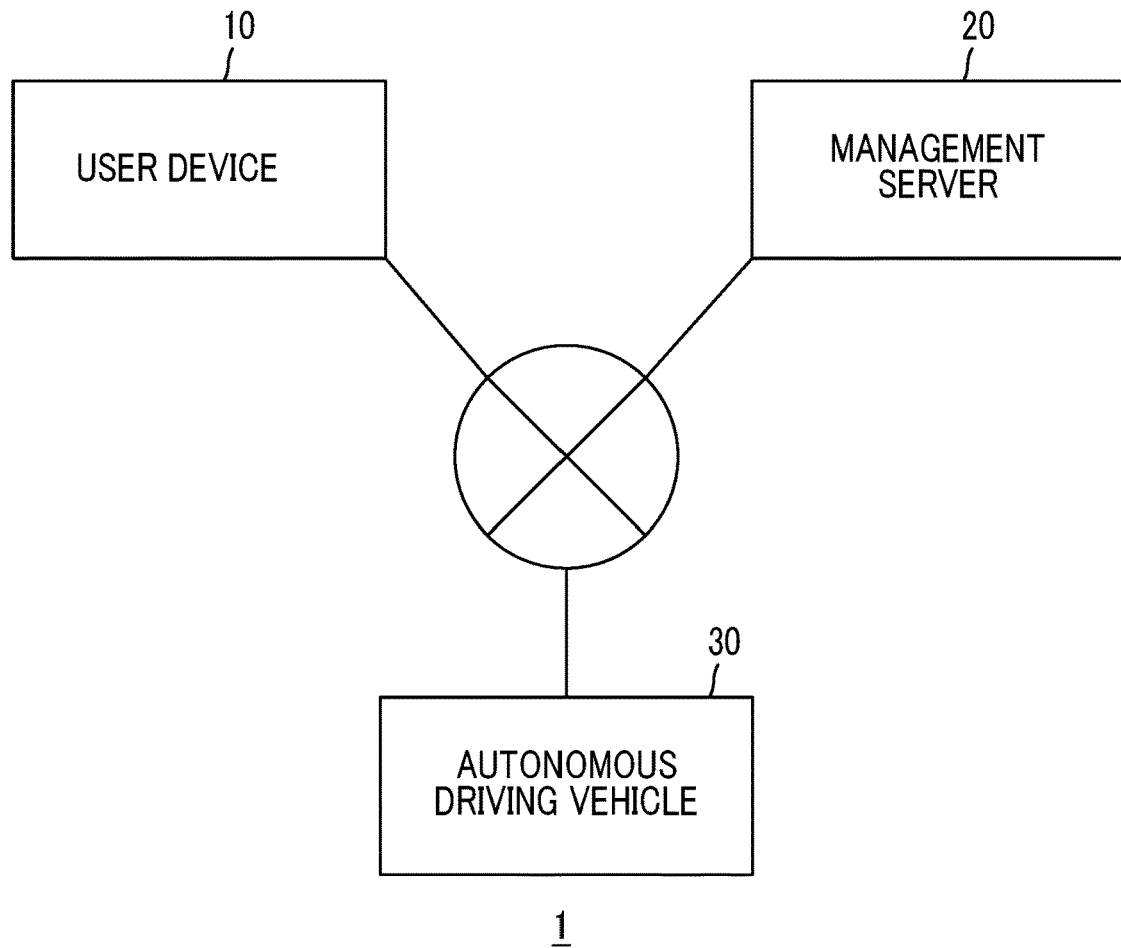
FIG. 1 is a block diagram schematically showing the configuration of a vehicle dispatch system for an autonomous driving vehicle according to Embodiment 1.

Hereinafter, embodiments will be described referring to the drawings. However, it is to be understood that, in a case where number, such as the number of pieces of each element, numerical quantity, amount, and range, are mentioned in the following embodiments, the embodiment is not limited to the numbers mentioned, except for a case where the numbers are particularly clearly specified or apparently specified in principle. The structure, steps, and the like described in the following embodiments are not necessarily needed, except for a case where the structure, steps, and the like are particularly clearly specified or apparently specified in principle.

Embodiment 1

1-1. Vehicle Dispatch System for Autonomous Driving Vehicle

FIG. 1 is a block diagram schematically showing the configuration of a vehicle dispatch system for an autonomous driving vehicle according to Embodiment 1. A vehicle dispatch system 1 provides a vehicle dispatch service of an autonomous driving vehicle to a user. The vehicle dispatch system 1 includes a user device 10, a management server 20, and an autonomous driving vehicle 30.

The user device 10 is a terminal that is carried with the user of the vehicle dispatch service. The user device 10 includes at least a processor, a storage device, and a communication device, and can perform various kinds of information processing and communication processing. For example, the user device 10 can communicate with the management server 20 and the autonomous driving vehicle 30 through a communication network. As the user device 10 described above, a smartphone is exemplified.

The management server 20 is a server that primarily manages the vehicle dispatch service. The management server 20 includes at least a processor, a storage device, and a communication device, and can perform various kinds of information processing and communication processing. For example, the management server 20 can communicate with the user device 10 and the autonomous driving vehicle 30 through the communication network. The management server 20 manages information of the user. Furthermore, the management server 20 manages vehicle dispatch or the like of the autonomous driving vehicle 30.

The autonomous driving vehicle 30 can be in an unmanned operation. The autonomous driving vehicle 30 provides the vehicle dispatch service to a pickup position desired by the user and a transportation service to a destination to the user. The autonomous driving vehicle 30 can communicate with the user device 10 and the management server 20 through the communication network.

A basic flow of the vehicle dispatch service of the autonomous driving vehicle is as follows.

Figure 2:
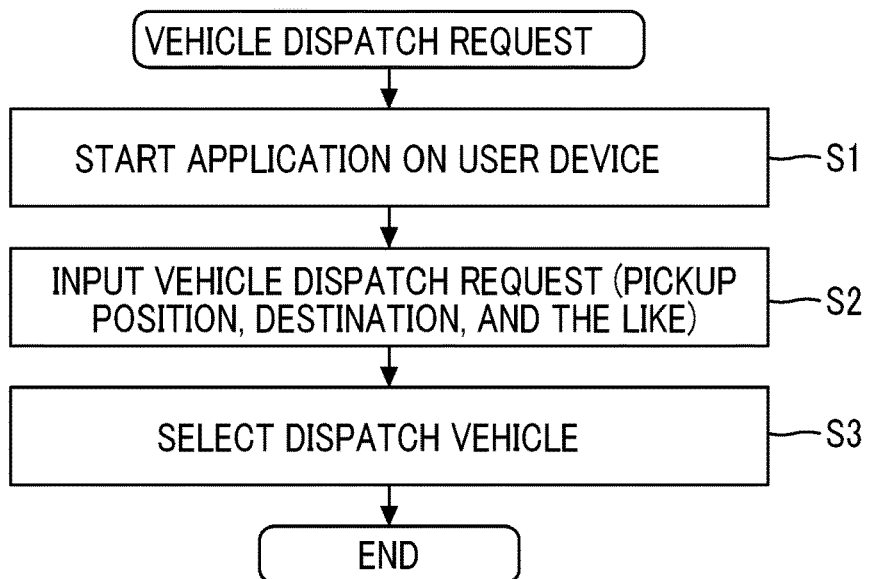
FIG. 2 is a flowchart showing an example of a procedure of a vehicle dispatch request.

First, the user transmits a vehicle dispatch request using the user device 10. FIG. 2 is a flowchart showing an example of a procedure of the vehicle dispatch request. As shown in FIG. 2, the user first starts a dedicated application on the user device 10 (Step S1). The user operates the started application to input the vehicle dispatch request (Step S2). The vehicle dispatch request includes a pickup position desired by the user, a destination, and the like. The pickup position desired by the user may be obtained from positional information of the user device 10. The vehicle dispatch request is sent to the management server 20 through the communication network. The management server 20 selects an dispatch vehicle that provides the service to the user from among the autonomous driving vehicles 30 around the user (Step S3), and sends information of the vehicle dispatch request to the selected dispatch vehicle. The dispatch vehicle may be selected and determined by the user. The dispatch vehicle that receives information automatically moves to the pickup position desired by the user. The dispatch vehicle provides the transportation service of automatically traveling toward the destination after the user gets in the vehicle at the pickup position desired by the user.

1-2. Outline of Superimposed Image Generation Processing

When the dispatch vehicle moves to the pickup position desired by the user in the vehicle dispatch service of the autonomous driving vehicle, the following problem may occur. For example, even though the dispatch vehicle approaches near the pickup position desired by the user, the user does not ascertain a direction from which the dispatch vehicle comes, it may be difficult to specify the dispatch vehicle. The problem described above appears significantly in a case where a plurality of vehicles travels, or the like.

According to Embodiment 1, when the dispatch vehicle approaches, a position of the dispatch vehicle and a position of the user device that is carried with the user are estimated. The position of the user device is estimated by, for example, a global positioning system (GPS) receiver. The position of the dispatch vehicle is specified through localization processing. The localization processing is processing for accurately estimating the dispatch vehicle position based on comparison of information (hereinafter, referred to as "surrounding environment recognition information") of a surrounding environment of the dispatch vehicle recognized by a surrounding circumstance sensor mounted in the dispatch vehicle with information (hereinafter, referred to as "surrounding environment storage information") of the surrounding environment of the dispatch vehicle stored in advance.

Figure 3:
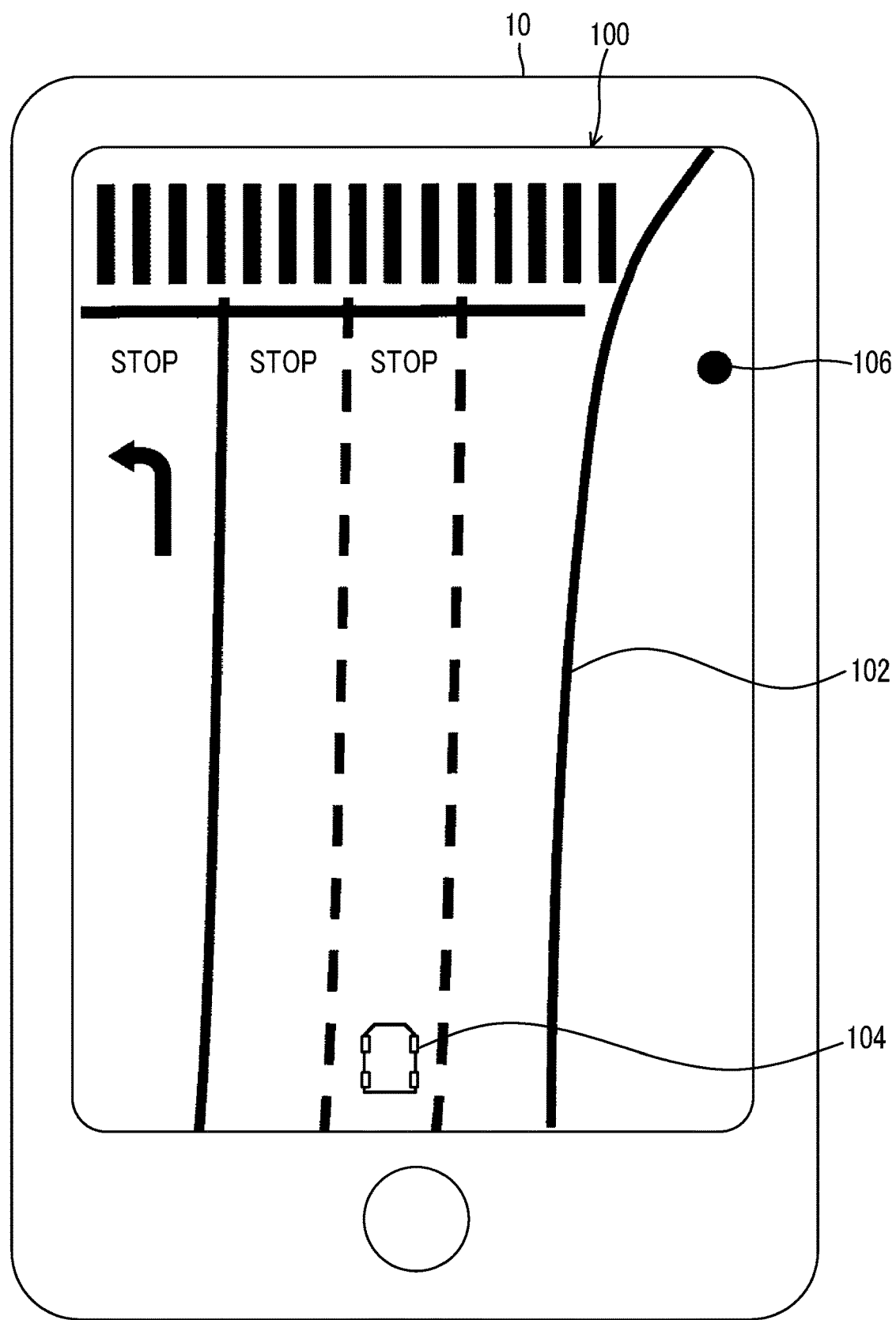
FIG. 3 is a diagram showing an example of a superimposed image displayed on a user device through superimposed image generation processing.

The estimated dispatch vehicle position and user device position are displayed on a surrounding image generated based on the surrounding environment recognition information or the surrounding environment storage information in a superimposed manner. The surrounding image is an image including information of an actual lane shape, a road marking, and the like, and is constituted as, for example, a 2D image or a 3D image in a top view. A 2D or 3D superimposed image superimposed with the dispatch vehicle position and the user device position is displayed on the user device. Hereinafter, a series of processing described above is referred to as "superimposed image generation processing". FIG. 3 is a diagram showing an example of a superimposed image displayed on the user device through the superimposed image generation processing. In the example shown in FIG. 3, a 2D superimposed image 100 is displayed on a display unit of the user device 10. The superimposed image 100 is generated by superimposing an dispatch vehicle position 104 and a user device position 106 on a surrounding image 102. According to the superimposed image generation processing, since an accurate position of the dispatch vehicle can be ascertained in association with the user device position and the surrounding image, it is possible to allow the user to easily specify the dispatch vehicle that is actually approaching.

Hereinafter, the configuration of the autonomous driving vehicle 30, the configuration of the user device 10, and the superimposed image generation processing constituting the vehicle dispatch system 1 according to Embodiment 1 will be described in detail.

1-3. Configuration Example of Autonomous Driving Vehicle

Figure 4:
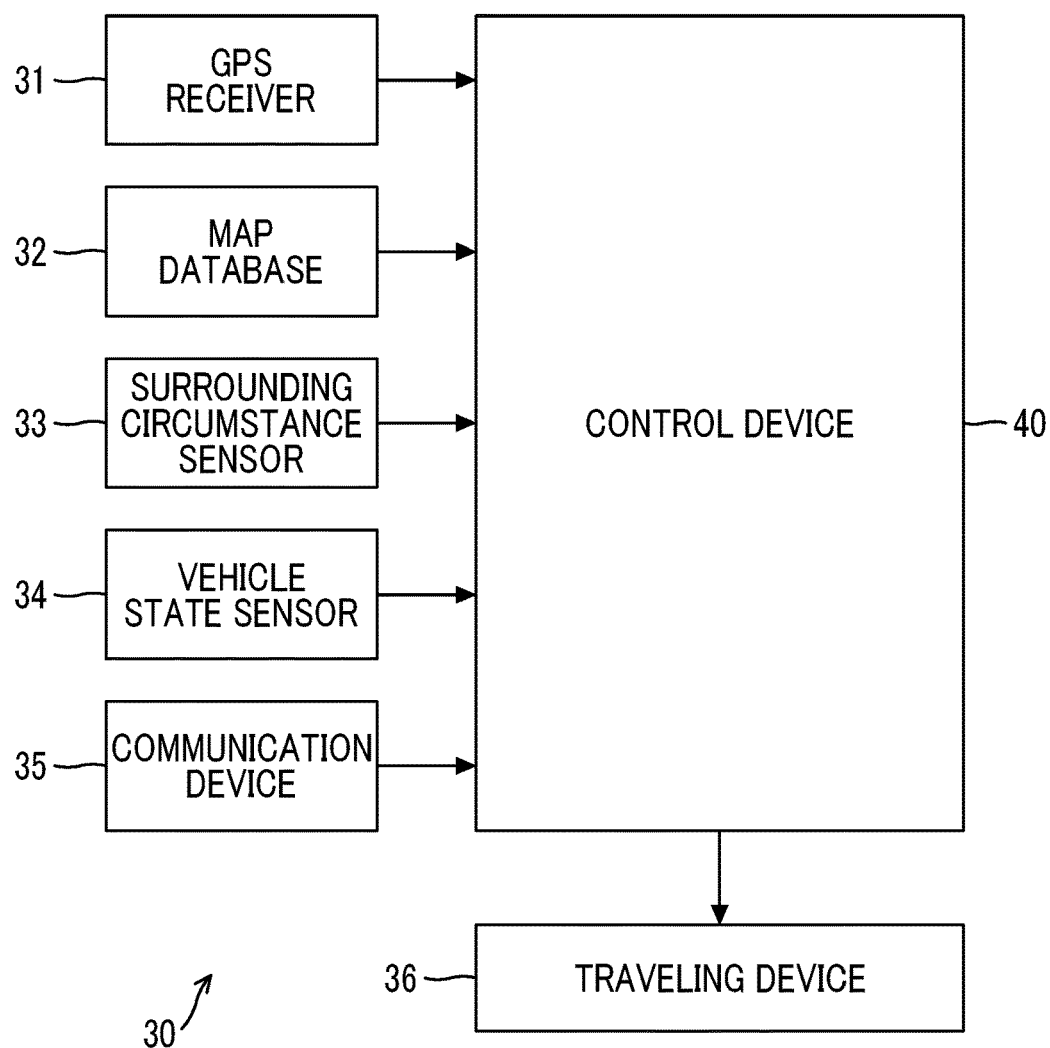
FIG. 4 is a block diagram showing a configuration example of an autonomous driving vehicle according to Embodiment 1.

FIG. 4 is a block diagram showing a configuration example of the autonomous driving vehicle 30 according to Embodiment 1. The autonomous driving vehicle 30 includes a GPS receiver 31, a map database 32, a surrounding circumstance sensor 33, a vehicle state sensor 34, a communication device 35, a traveling device 36, and a control device 40. The GPS receiver 31 receives signals transmitted from a plurality of GPS satellites and calculates a position and an azimuth of the vehicle based on the received signals. The GPS receiver 31 sends the calculated information to the control device 40.

In the map database 32, map information, such as landforms, roads, and traffic signs, and information indicating a boundary position of each lane of a road on a map are stored in advance. The boundary position of each lane is represented by a point group or a line group. The map database 32 is stored in a predetermined storage device.

The surrounding circumstance sensor 33 detects circumstances around the vehicle. As the surrounding circumstance sensor 33, laser imaging detection and ranging (LIDAR), a radar, a camera, or the like is exemplified. The lidar detects an object around the vehicle using light. The radar detects an object around the vehicle using an electric wave. The camera captures images of circumstances around the vehicle. The surrounding circumstance sensor sends the detected information to the control device 40.

The vehicle state sensor 34 detects a traveling state of the vehicle. As the vehicle state sensor 34, a lateral acceleration sensor, a yaw rate sensor, a vehicle speed sensor, or the like is exemplified. The lateral acceleration sensor detects a lateral acceleration that is applied to the vehicle. The yaw rate sensor detects a yaw rate of the vehicle. The vehicle speed sensor detects a speed of the vehicle. The vehicle state sensor 34 sends the detected information to the control device 40.

The communication device 35 performs communication with the outside of the autonomous driving vehicle 30. Specifically, the communication device 35 performs communication with the user device 10 through the communication network. The communication device 35 performs communication with the management server 20 through the communication network.

The traveling device 36 includes a drive device, a braking device, a steering device, a transmission, and the like. The drive device is a power source that generates drive power. As the drive device, an engine or an electric motor is exemplified. The braking device generates braking force. The steering device steers wheels. For example, the steering device includes an electronic power steering (EPS) device. The wheels can be steered through drive control of a motor of the electronic power steering device.

The control device 40 performs autonomous driving control for controlling autonomous driving of the vehicle. Typically, the control device 40 is a microcomputer including a processor, a storage device, and an input/output interface. The control device 40 is also referred to as an electronic control unit (ECU). The control device 40 receives various kinds of information through the input/output interface. Then, the control device 40 performs the autonomous driving control based on the received information. For example, the control device 40 performs the autonomous driving control for automatically moving the vehicle to the pickup position desired by the user based on information of the vehicle dispatch request received from the management server 20.

Figure 5:
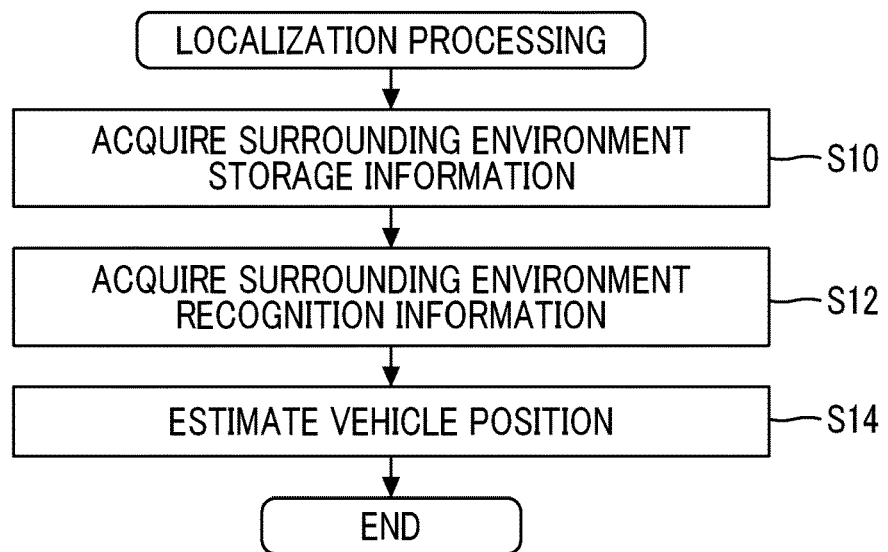
FIG. 5 is a flowchart showing a routine of localization processing that is executed in a control device of the autonomous driving vehicle.

The control device 40 performs the localization processing for estimating an accurate dispatch vehicle position based on comparison of the surrounding environment storage information stored in the map database 32 with the surrounding environment recognition information recognized by the surrounding circumstance sensor 33. FIG. 5 is a flowchart showing a routine of the localization processing that is executed in the control device of the autonomous driving vehicle. Hereinafter, specific processing of the localization processing will be described referring to the flowchart.

In the localization processing, first, the control device 40 acquires the surrounding environment storage information (Step S10). Here, specifically, environment information surrounding the vehicle position calculated based on the received signals of the GPS receiver 31 among information stored in the map database 32 is acquired as a surrounding environment storage information associated with positional information. As the surrounding environment storage information, an object, such as a landform, a road, a lane, or a traffic sign, is exemplified.

The control device 40 acquires environment information surrounding the vehicle position among information recognized using the surrounding circumstance sensor 33 as surrounding environment recognition information associated with positional information (Step S12). As the surrounding environment recognition information, an image around the vehicle captured by the camera, an object, such as a landform, a road, a lane, a traffic sign, recognized by the lidar, or the like is exemplified.

The control device 40 estimates the position and the azimuth of the host vehicle by comparing the acquired surrounding environment storage information with the acquired surrounding environment recognition information (Step S14). The vehicle position herein is an absolute position in a global coordinate system. With the estimation of the vehicle position through the localization processing described above, it is possible to estimate a more accurate vehicle position than in a case where the vehicle position is estimated solely using the GPS receiver 31.

1-4. Configuration Example of User Device

Figure 6:
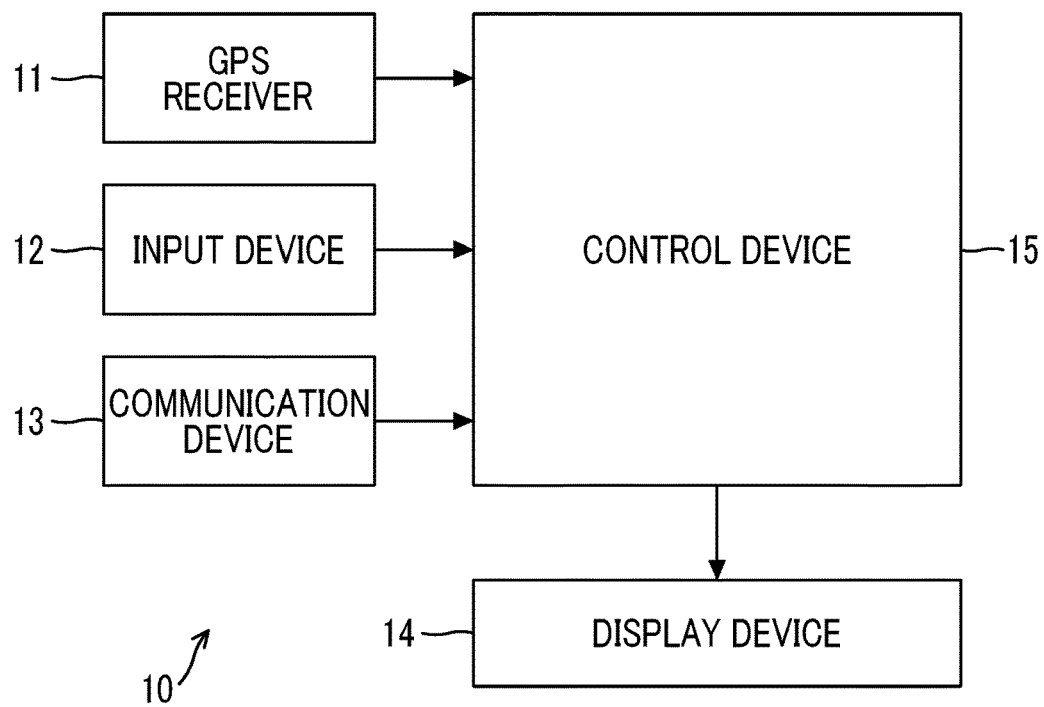
FIG. 6 is a block diagram showing a configuration example of a user device according to Embodiment 1.

FIG. 6 is a block diagram showing a configuration example of the user device 10 according to Embodiment 1. The user device 10 includes a GPS receiver 11, an input device 12, a communication device 13, a display device 14, and a control device 15. The GPS receiver 11 receives signals transmitted from a plurality of GPS satellites and calculates a position and an azimuth of the user device 10 based on the received signals. The GPS receiver 11 sends the calculated information to the control device 15.

The input device 12 is a device that is used when the user inputs information and operates the application. As the input device 12, a touch panel, a switch, or a button is exemplified. The user can input, for example, the vehicle dispatch request using the input device 12.

The communication device 13 performs communication with the outside of the user device 10. Specifically, the communication device 13 performs communication with the autonomous driving vehicle 30 through the communication network. The communication device 13 performs communication with the management server 20 through the communication network.

The display device 14 includes a display that displays an image or video. As the display device 14, a liquid crystal display (LCD) is exemplified. The display device 14 may be constituted as a touch panel combined with the input device 12.

The control device 15 controls various operations of the user device 10. Typically, the control device 15 is a microcomputer including a processor, a storage device, and an input/output interface. The control device 15 is also referred to as an ECU. The control device 15 receives various operations through the input/output interface. Then, the control device 15 performs various operations based on the received information.

1-5. Superimposed Image Generation Processing

Figure 7:
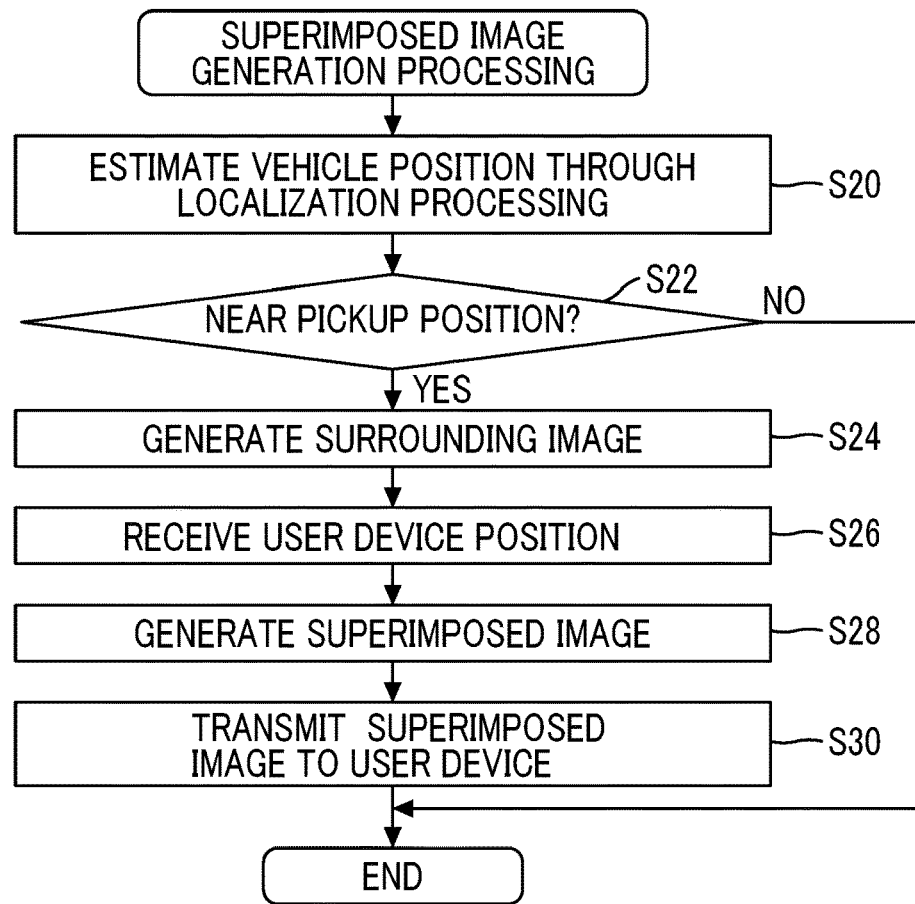
FIG. 7 is a flowchart showing a routine of the superimposed image generation processing that the control device of the autonomous driving vehicle performs.

In a case where the dispatched autonomous driving vehicle 30 approaches the pickup position desired by the user, the autonomous driving vehicle 30 performs the superimposed image generation processing for generating the superimposed image and transmitting the superimposed image to the user device. FIG. 7 is a flowchart showing a routine of the superimposed image generation processing that the control device 40 of the autonomous driving vehicle 30 performs. The routine of FIG. 7 is repeatedly executed while the dispatched autonomous driving vehicle 30 moves to the pickup position desired by the user. In the routine shown in FIG. 7, first, the control device 40 estimates the vehicle position through the localization processing (Step S20). Here, specifically, the present vehicle position of the dispatch vehicle is estimated according to the routine of the localization processing shown in FIG. 5 described above.

The control device 40 determines whether or not the dispatch vehicle reaches near the pickup position desired by the user (Step S22). Here, determination is made whether or not the vehicle position estimated in Step S20 falls within a predetermined range from the pickup position desired by the user input in the vehicle dispatch request. As a result, in a case where determination is not established, the routine of FIG. 7 ends.

In the processing of Step S22, in a case where determination is established, the process progresses to the next step. In the next step, the control device 40 generates the surrounding image (Step S24). Here, the surrounding image of the vehicle position is generated using the surrounding environment recognition information or the surrounding environment storage information acquired through the localization processing. The surrounding image of the vehicle position may be a 2D image or a stereoscopically viewable 3D image. A type and a generation method of the surrounding image are not limited. A method of generating a 2D image or a 3D image using the surrounding environment recognition information recognized by the surrounding circumstance sensor 33, such as a lidar or a method of generating a 2D image or a 3D image using the surrounding environment storage information stored in the map database 32 is already suggested in various documents. Here, the surrounding image surrounding the dispatch vehicle can be generated using a known technique.

Figure 8:
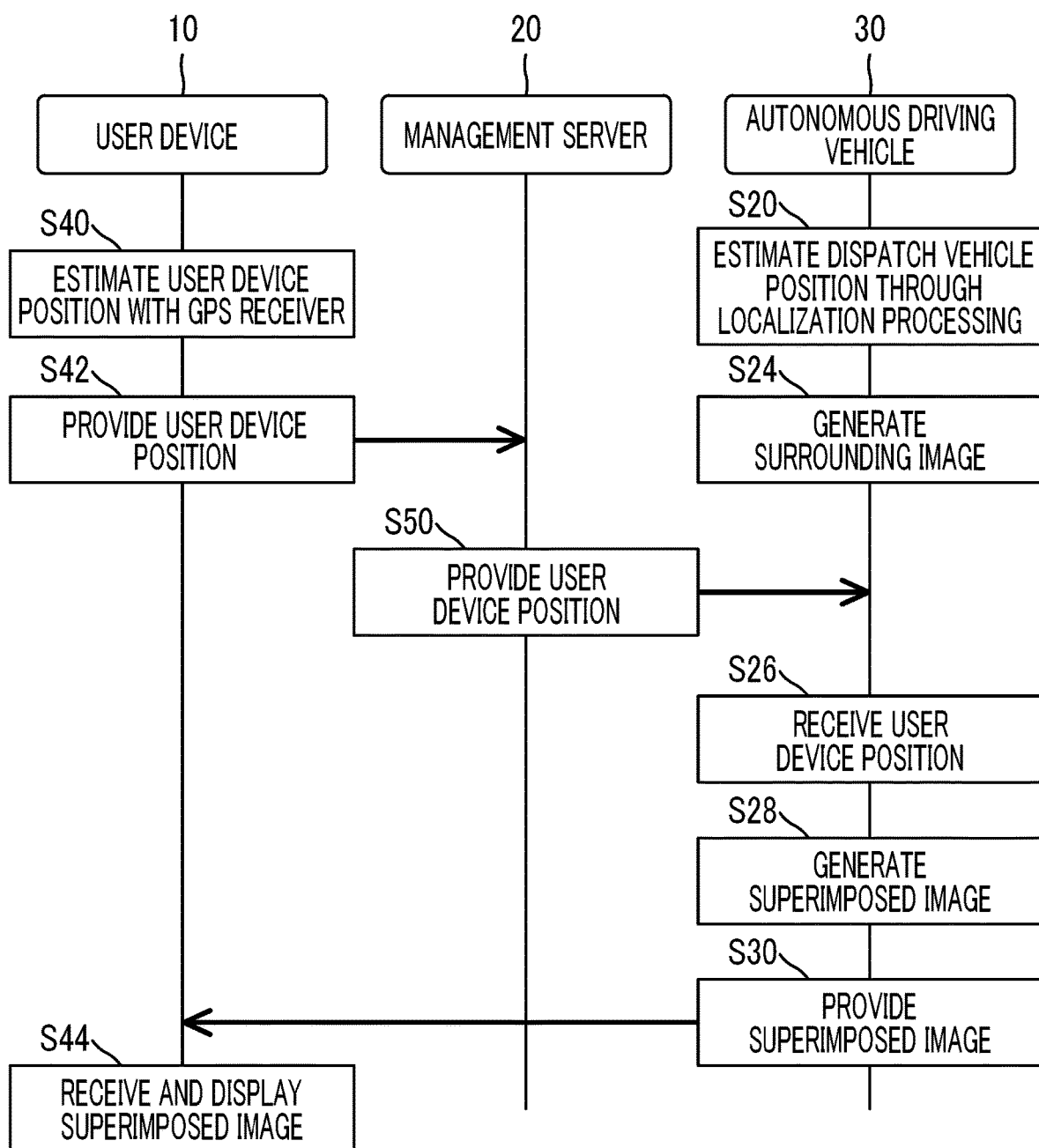
FIG. 8 is a diagram showing an example of a reception method of a user device position in the autonomous driving vehicle.

The control device 40 receives the user device position (Step S26). FIG. 8 is a diagram showing an example of a reception method of the user device position in the autonomous driving vehicle 30. In FIG. 8, processing common to the steps shown in FIG. 7 is represented by the same step numbers, and description thereof will not be repeated. First, the user device 10 estimates the user device position based on the received signals of the GPS receiver 11 (Step S40). The user device position estimated here is an absolute position in a global coordinate system. Then, the user device 10 provides the estimated user device position to the management server 20 (Step S42). The management server 20 provides the provided user device position to the dispatched autonomous driving vehicle 30 (Step S50). A provision source of the user device position is not limited to the management server 20, and may be configured to receive the user device position directly from the user device 10.

Returning to the routine shown in FIG. 7, next, the control device 40 generates the superimposed image (Step S28). Here, an image having the vehicle position and the user device position superimposed on the surrounding image is generated using the vehicle position estimated in Step S20, the user device position received in Step S26, and the surrounding image generated in Step S24.

The control device 40 transmits the generated superimposed image to the user device 10 (Step S30). A transmission destination of the superimposed image is not limited to an aspect where the superimposed image is transmitted directly to the user device 10, and may be an aspect where the superimposed image is transmitted to the user device 10 by way of the management server 20.

The user device 10 receives the superimposed image and displays the superimposed image on the display device 14 of the user device 10 (Step S44 of FIG. 8).

With the superimposed image generation processing described above, since the position of the user device 10 carried with the user and the accurate position of the dispatched autonomous driving vehicle 30 are displayed on the surrounding image in a superimposed manner, it is possible to allow the user to easily specify an dispatch vehicle that moves to the pickup position desired by the user.

1-6. Modification Example of Embodiment 1

In regard to the vehicle dispatch system for an autonomous driving vehicle of Embodiment 1, a form modified as described below may be applied.

Figure 9:
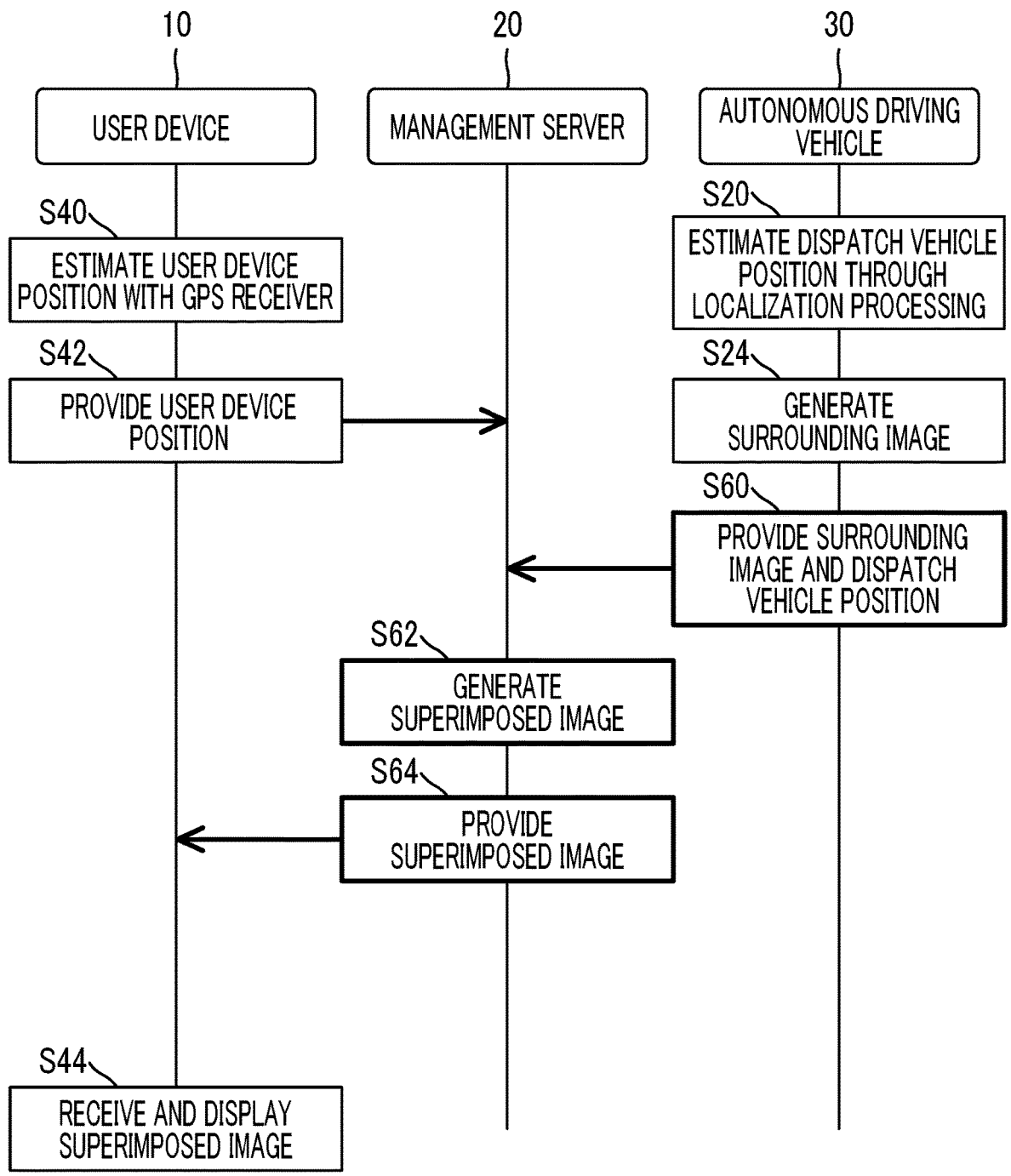
FIG. 9 is a diagram showing an example of a generation method of a superimposed image in a management server.

In the above-described superimposed image generation processing, the management server 20 may perform the processing for generating the superimposed image, or the management server 20 may perform both of the processing for generating the surrounding image and the processing for generating the superimposed image. FIG. 9 is a diagram showing an example of a generation method of the superimposed image in the management server 20. In FIG. 9, processing common to the steps of FIG. 8 is represented by the same step numbers, and description thereof will not be repeated. As shown in FIG. 9, the autonomous driving vehicle 30 provides the surrounding image and the dispatch vehicle position to the management server 20 (Step S60). The management server 20 generates an image having the dispatch vehicle position and the user device position superimposed on the surrounding image using the dispatch vehicle position and the user device position (Step S62). Then, the management server 20 transmits the generated superimposed image to the user device 10 (Step S64).

Figure 10:
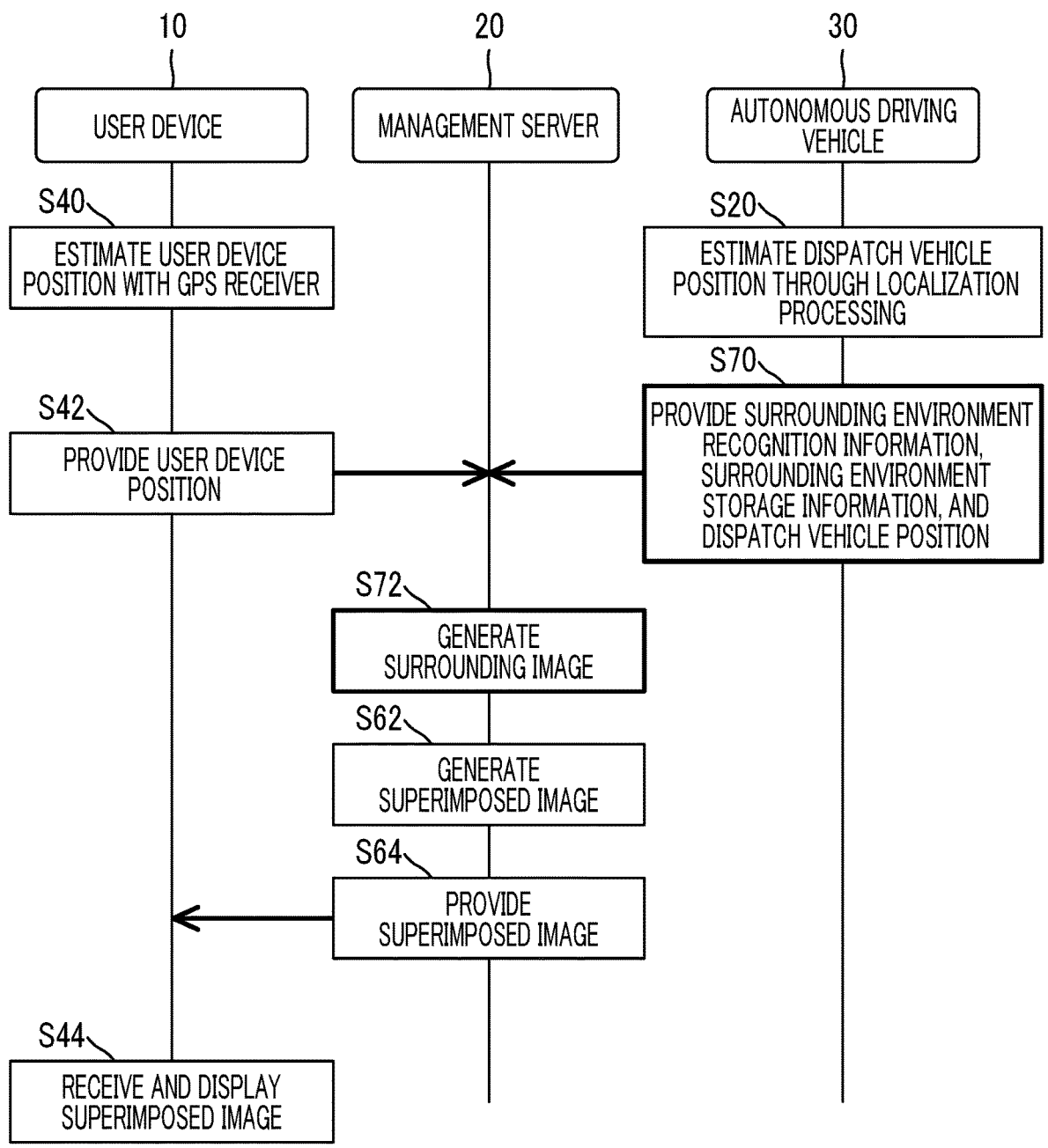
FIG. 10 is a diagram showing an example of a generation method of a surrounding image and a generation method of a superimposed image in the management server.

FIG. 10 is a diagram showing an example of a generation method of the surrounding image and a generation method of the superimposed image in the management server 20. In FIG. 10, processing common to the steps of FIG. 8 or 9 is represented by the same step numbers, and description thereof will not be repeated. As shown in FIG. 10, the autonomous driving vehicle 30 provides the surrounding environment recognition information, the surrounding environment storage information, and the dispatch vehicle position to the management server 20 (Step S70). The management server 20 generates the surrounding image using the provided surrounding environment recognition information or surrounding environment storage information (Step S72). Then, in Step S62, the superimposed image having the dispatch vehicle position and the user device position superimposed on the generated surrounding image is generated.

In the vehicle dispatch system for an autonomous driving vehicle of Embodiment 1, the processing of Step S12 is an example of processing in the "recognition information acquisition unit" of the first aspect, the processing of Step S10 is an example of processing in the "storage information acquisition unit" of the first aspect, the processing of Step S14 is an example of processing in the "dispatch vehicle position estimation unit" of the first aspect, the processing of Step S40 is an example of processing in the "user device position estimation unit" of the first aspect, the processing of Step S24 is an example of processing in the "surrounding image generation unit" of the first aspect, the processing of Step S28 is an example of processing in the "superimposed image generation unit" of the first aspect, and the processing of Step S44 is an example of processing in the "image display unit" of the first aspect.

In the autonomous driving vehicle of Embodiment 1, the processing of Step S12 is an example of processing in the "recognition information acquisition unit" of the second aspect, the processing of Step S10 is an example of processing in the "storage information acquisition unit" of the second aspect, the processing of Step S14 is an example of processing in the "dispatch vehicle position estimation unit" of the second aspect, the processing of Step S26 is an example of processing in the "user device position reception unit" of the second aspect, the processing of Step S24 is an example of processing in the "surrounding image generation unit" of the second aspect, the processing of Step S28 is an example of processing in the "superimposed image generation unit" of the second aspect, and the processing of Step S30 is an example of processing in the "image transmission unit" of the second aspect.

In the vehicle dispatch system for an autonomous driving vehicle of Embodiment 1, the processing of Step S12 is an example of processing in "acquiring the recognition information" of the third aspect, the processing of Step S10 is an example of processing in "acquiring the storage information" of the third aspect, the processing of Step S14 is an example of processing in "estimating the dispatch vehicle position" of the third aspect, the processing of Step S40 is an example of processing in "estimating the user device position" of the third aspect, the processing of Step S24 is an example of processing in "generating the surrounding image" of the third aspect, the processing of Step S28 is an example of processing in "generating the superimposed image" of the third aspect, and the processing of Step S44 is an example of processing in "displaying the image" of the third aspect.

Embodiment 2

A vehicle dispatch system for an autonomous driving vehicle of Embodiment 2 will be described.

2-1. Features of Embodiment 2

Figure 11:
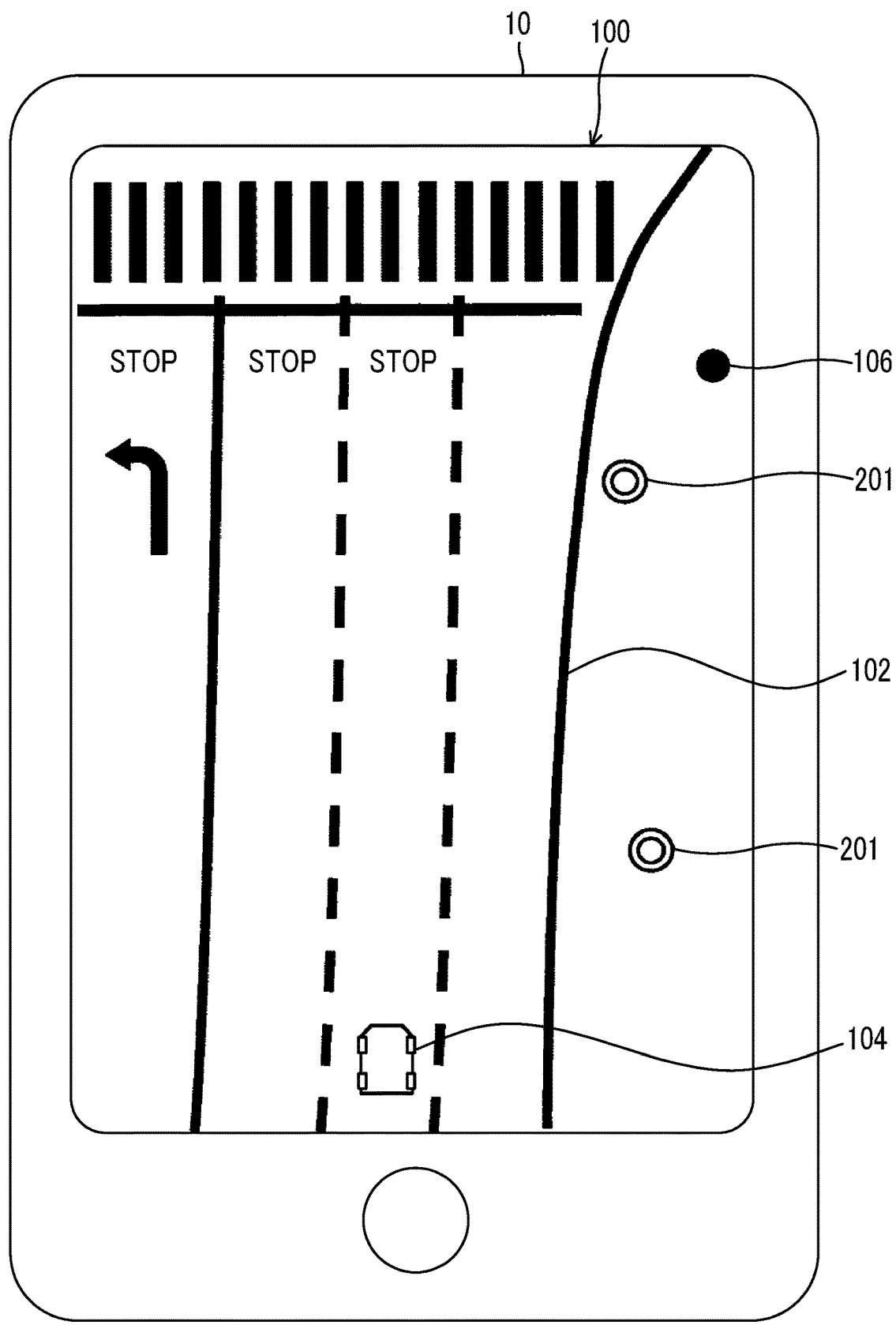
FIG. 11 is a diagram showing an example of a superimposed image displayed on a user device through superimposed image generation processing in a vehicle dispatch system for an autonomous driving vehicle of Embodiment 2.

FIG. 11 is a diagram showing an example of a superimposed image displayed on a user device through superimposed image generation processing in the vehicle dispatch system for an autonomous driving vehicle of the Embodiment 2. As shown in FIG. 11, a superimposed image 100 that is displayed in the vehicle dispatch system for an autonomous driving vehicle of Embodiment 2 is superimposed with actual pedestrian positions 201 in addition to the dispatch vehicle position 104 and the user device position 106. The pedestrian positions 201 are actual positions of pedestrians around the dispatch vehicle. In FIG. 11, positions of two pedestrians are illustrated. In the example shown in FIG. 11, while the user device position 106 and the pedestrian positions 201 are displayed by different symbols, the user device position 106 and the pedestrian positions 201 may be displayed by the same symbol.

Figure 12:
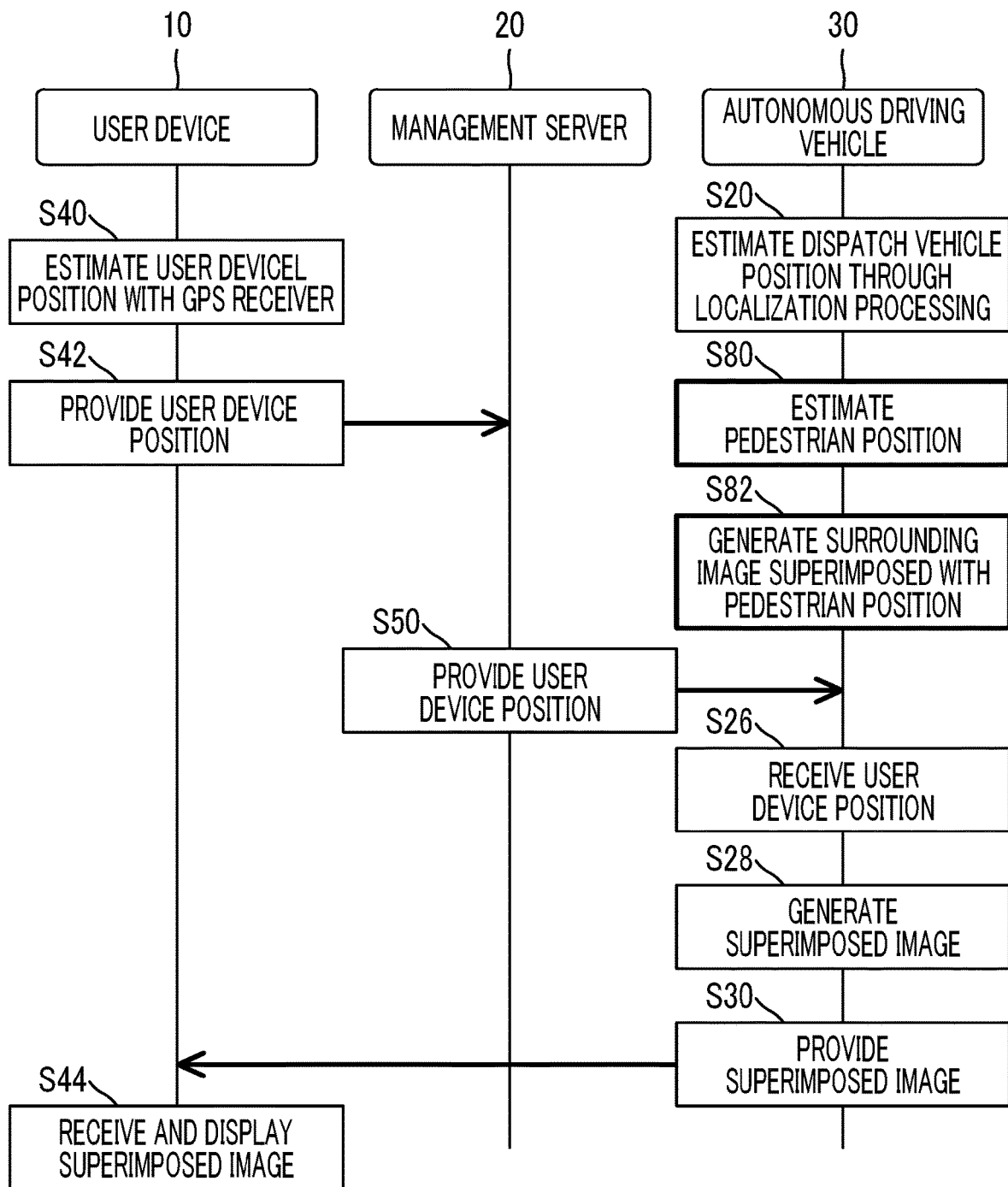
FIG. 12 is a diagram showing an example of a reception method of a user device position in the autonomous driving vehicle of Embodiment 2.

FIG. 12 is a diagram showing an example of a reception method of the user device position in the autonomous driving vehicle of Embodiment 2. In FIG. 12, processing common to the steps shown in FIG. 8 is represented by the same step numbers, and description thereof will not be repeated.

Information relating to the pedestrian positions 201 is included in the surrounding environment recognition information, that is, information recognized by the surrounding circumstance sensor 33. The control device 40 of the autonomous driving vehicle 30 estimates the pedestrian positions 201 based on the acquired surrounding environment recognition information (Step S80). Here, specifically, for example, in a case where the lidar is used as the surrounding circumstance sensor 33, the control device 40 performs classification processing based on information of a point group detected by the lidar. Then, the control device 40 estimates recognized gravity center positions of the pedestrians as the pedestrian positions 201. The pedestrian positions 201 are absolute positions in a global coordinate system.

Then, in the next step, the control device 40 generates a surrounding image 102 superimposed with the pedestrian positions 201 (Step S82). In the example shown in FIG. 11, the control device 40 generates the surrounding image 102 having the pedestrian positions 201 represented by double circles superimposed on a 2D surrounding image. The control device 40 may generate the surrounding image 102 represented by a 3D image. In this case, the control device 40 may generate the surrounding image 102 having the pedestrian positions 201 represented by template images for a pedestrian superimposed on a 3D surrounding image.

In subsequent Step S28, a superimposed image 100 is generated using the surrounding image 102 superimposed with the pedestrian positions 201. With the superimposed image 100 generated as described above, it is possible to more easily specify the dispatch vehicle based on the displayed positions of the pedestrians.

2-2. Modification Example of Embodiment 2

Meanwhile, a method that generates the superimposed image 100 superimposed with the pedestrian positions 201 is not limited to the above-described method. For example, the control device 40 of the autonomous driving vehicle 30 may perform processing for superimposing the pedestrian positions 201 on the superimposed image 100, in place of processing for superimposing the pedestrian positions 201 on the surrounding image 102.

Figure 13:
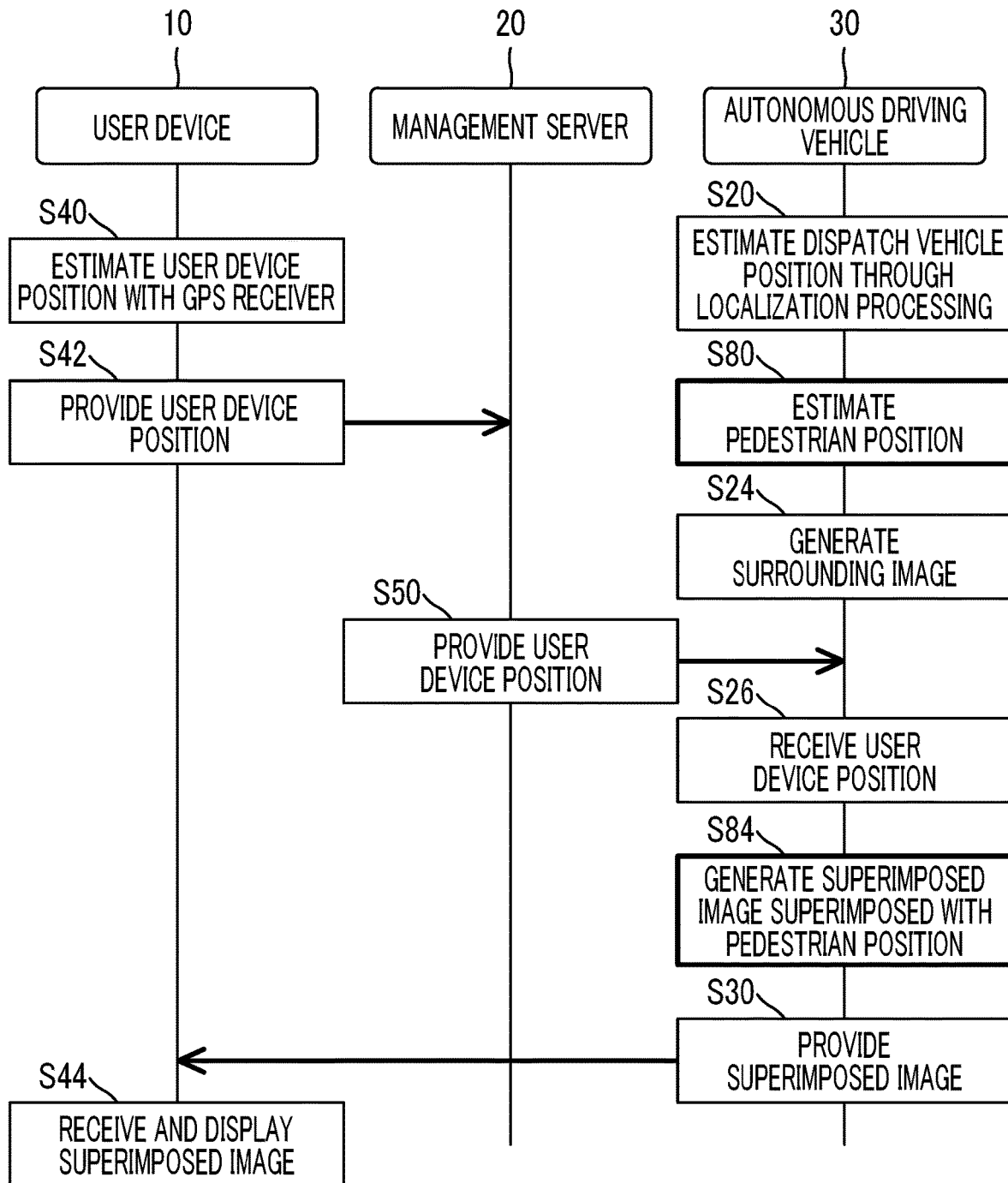
FIG. 13 is a diagram showing another example of a reception method of a user device position in the autonomous driving vehicle of Embodiment 2.

FIG. 13 is a diagram showing another example of a reception method of the user device position in the autonomous driving vehicle of Embodiment 2. In FIG. 13, processing common to the steps shown in FIGS. 8 and 12 is represented by the same step numbers, and description thereof will not be repeated or will be simplified.

The control device 40 of the autonomous driving vehicle 30 estimates the pedestrian positions 201 in the processing of Step S80. In the processing of next Step S24, the surrounding image 102 is generated without superimposing the pedestrian positions 201. Then, the control device 40 generates the superimposed image 100 having the pedestrian positions 201 superimposed on the surrounding image 102, in addition to the dispatch vehicle position 104 and the user device position 106 (Step S84). In the method described above, it is also possible to generate the superimposed image 100 superimposed with the pedestrian positions 201.

In the vehicle dispatch system for an autonomous driving vehicle of Embodiment 2, the processing of Step S80 is an example of processing in the "pedestrian position estimation unit" of the first aspect, and the processing of Step S82 is an example of processing in the "surrounding image generation unit" of the first aspect.

In the vehicle dispatch system for an autonomous driving vehicle of Embodiment 2, the processing of Step S80 is an example of processing in the "pedestrian position estimation unit" of the first aspect, and the processing of Step S84 is an example of processing in the "superimposed image generation unit" of the first aspect.

In the autonomous driving vehicle of Embodiment 2, the processing of Step S80 is an example of processing in the "pedestrian position estimation unit" of the second aspect, and the processing of Step S82 is an example of processing in the "surrounding image generation unit" of the second aspect.

In the autonomous driving vehicle of Embodiment 2, the processing of Step S80 is an example of processing in the "pedestrian position estimation unit" of the second aspect, and the processing of Step S84 is an example of processing in the "superimposed image generation unit" of the second aspect.

Embodiment 3

A vehicle dispatch system for an autonomous driving vehicle of Embodiment 3 will be described.

3-1. Features of Embodiment 3

Figure 14:
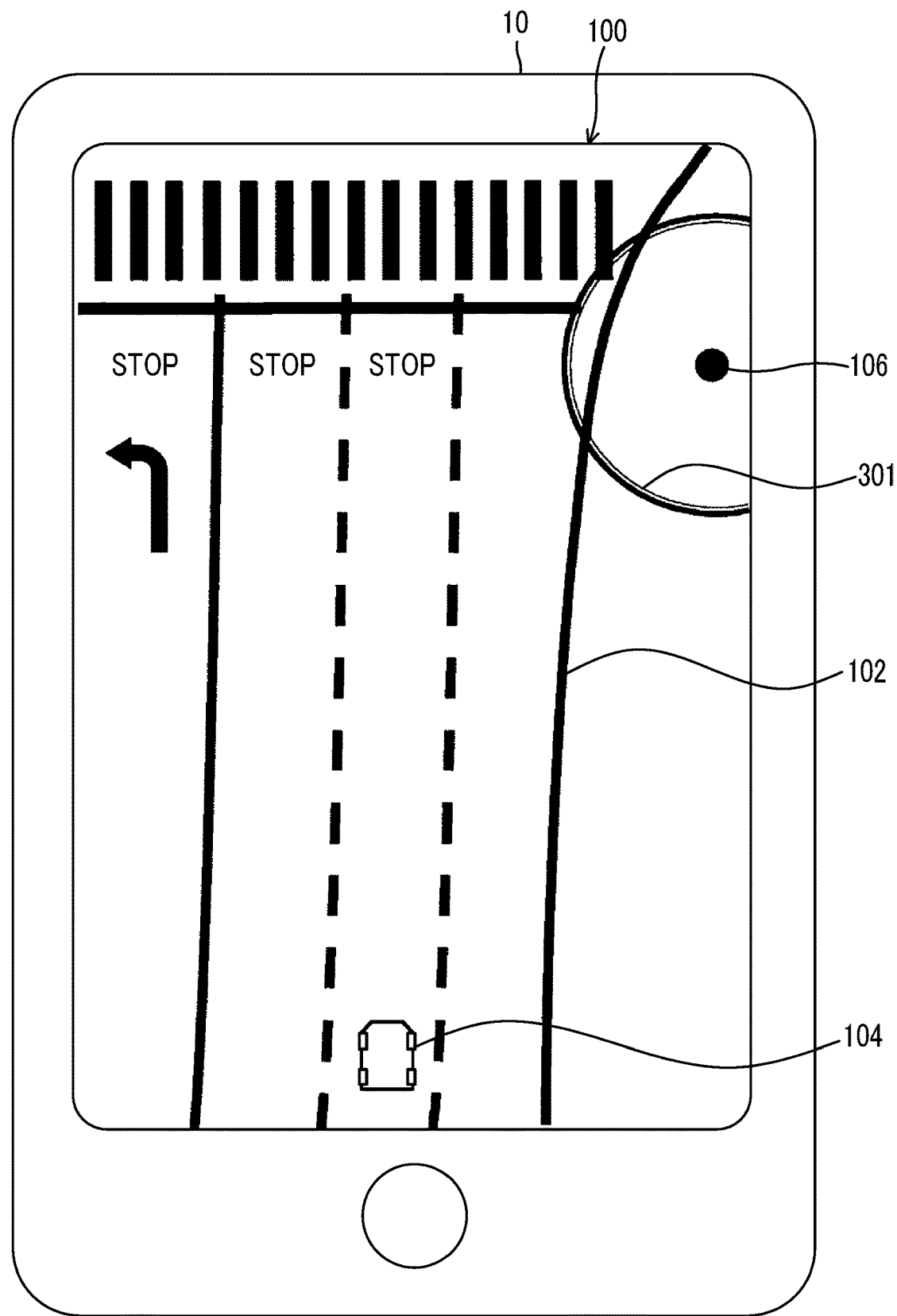
FIG. 14 is a diagram showing an example of a superimposed image displayed on a user device through superimposed image generation processing in a vehicle dispatch system for an autonomous driving vehicle of Embodiment 3.

FIG. 14 is a diagram showing an example of a superimposed image displayed on a user device through superimposed image generation processing in the vehicle dispatch system for an autonomous driving vehicle of Embodiment 3. As shown in FIG. 14, a superimposed image 100 that is displayed in the vehicle dispatch system for an autonomous driving vehicle of Embodiment 3 is superimposed with an error range 301 of the user device position in addition to the dispatch vehicle position and the user device position. The error range 301 is a range of an error that occurs due to reception accuracy of the GPS receiver 31 of the user device 10, or the like. In FIG. 14, a range of a circle centering on the user device position 106 is illustrated as the error range 301.

FIG. 15 is a diagram showing an example of a reception method of the user device position and the error range of the user device position in the autonomous driving vehicle of Embodiment 3. In FIG. 15, processing common to the steps shown in FIG. 8 is represented by the same step numbers, and description thereof will not be repeated.

The control device 15 of the user device 10 estimates the user device position and the error range of the user device position based on the received signals of the GPS receiver 11 (Step S90). Typically, the error range 301 is estimated as an internal area of a circle having a predetermined radius centering on the estimated user device position. As another example, the error range 301 may be estimated every time based on the received signals of the GPS receiver 11. In a case where the dispatched autonomous driving vehicle 30 approaches the user device 10, an error of the GPS receiver 31 of the autonomous driving vehicle 30 corrected through the localization processing may be used in the error range 301. The estimated user device position and the estimated error range of the user device position are absolute positions in a global coordinate system. Then, the user device 10 provides the estimated user device position and the estimated error range of the user device position to the management server 20 (Step S92). The management server 20 provides the provided user device position and the provided error range of the user device position to the dispatched autonomous driving vehicle 30 (Step S94). A provision source of the user device position and the error range of the user device position is not limited to the management server 20, and the user device position and the error range of the user device position may be received directly from the user device 10.

The control device 40 receives the user device position and the error range of the user device position (Step S96). Then, the control device 40 generates a superimposed image 100 having the error range 301 of the user device position 106 superimposed on the surrounding image 102, in addition to the dispatch vehicle position 104 and the user device position 106 (Step S98).

The user device position estimated using the GPS receiver 11 has low accuracy compared to position estimation through the localization processing. With the vehicle dispatch system for an autonomous driving vehicle of Embodiment 3, since the error range of the user device position is displayed on the superimposed image, even in a case where there is an error in the user device position, it is possible to ascertain accurate user device position and dispatch vehicle position based on the error range and the surrounding image.

A configuration may be made in which the superimposed image including the error range of the user device position is also displayed on the autonomous driving vehicle 30 side. With the configuration described above, a driver who gets in the autonomous driving vehicle 30 easily specifies the user.

In the vehicle dispatch system for an autonomous driving vehicle of Embodiment 3, the processing of Step S90 is an example of processing in the "error range estimation unit" of the first aspect, and the processing of Step S98 is an example of processing in the "superimposed image generation unit" of the first aspect.

In the autonomous driving vehicle of Embodiment 3, the processing of Step S96 is an example of processing in the "error range reception unit" of the second aspect, and the processing of Step S98 is an example of processing in the "superimposed image generation unit" of the second aspect.

What is claimed is:

1. A vehicle dispatch system for an autonomous driving vehicle that provides a vehicle dispatch service in response to a vehicle dispatch request from a user, the vehicle dispatch system comprising:
   a recognition information acquisition unit configured to, by a sensor mounted in a dispatch vehicle, which is the autonomous driving vehicle to be dispatched, acquire surrounding environment recognition information, which is information of a surrounding environment of the dispatch vehicle;
   a storage information acquisition unit configured to acquire surrounding environment storage information, which is information of the surrounding environment of the dispatch vehicle stored in advance;
   a dispatch vehicle position estimation unit configured to estimate a dispatch vehicle position, which is a position of the dispatch vehicle, based on a comparison of the surrounding environment recognition information with the surrounding environment storage information;
   a user terminal position estimation unit configured to estimate a user terminal position, which is a position of a user terminal;
   a pedestrian position estimation unit configured to estimate a pedestrian position, which is a position of a pedestrian around the dispatch vehicle, based on the surrounding environment recognition information;
   a surrounding image generation unit configured to generate a surrounding image representing the surrounding environment of the dispatch vehicle based on the surrounding environment recognition information or the surrounding environment storage information;
   a superimposed image generation unit configured to generate a superimposed image having the dispatch vehicle position, the estimated pedestrian position and the user terminal position superimposed on the surrounding image representing the surrounding environment of the dispatch vehicle; and
   an image display unit configured to display the superimposed image on the user terminal.

2. The vehicle dispatch system according to claim 1, further comprising a management server, wherein:
   the dispatch vehicle position estimation unit, the surrounding image generation unit, and the superimposed image generation unit are mounted in the dispatch vehicle;
   the user terminal position estimation unit is mounted in the user terminal; and
   a communication device that is mounted in the dispatch vehicle is configured to receive the user terminal position estimated by the user terminal position estimation unit through the management server and transmit the superimposed image generated by the superimposed image generation unit to the user terminal.

3. The vehicle dispatch system according to claim 1, further comprising a management server, wherein:
   the dispatch vehicle position estimation unit and the surrounding image generation unit are mounted in the dispatch vehicle;
   the user terminal position estimation unit is mounted in the user terminal;
   the superimposed image generation unit is mounted in the management server; and
   the management server is configured to receive the user terminal position estimated by the user terminal position estimation unit and the surrounding image generated by the surrounding image generation unit, and transmit the superimposed image generated by the superimposed image generation unit to the user terminal.

4. The vehicle dispatch system according to claim 1, further comprising a management server, wherein:
   the surrounding image generation unit is mounted in the dispatch vehicle;
   the user terminal position estimation unit is mounted in the user terminal;
   the superimposed image generation unit is mounted in the management server; and
   the management server is configured to receive the user terminal position estimated by the user terminal position estimation unit and the surrounding image generated by the surrounding image generation unit, and transmit the superimposed image generated by the superimposed image generation unit to the user terminal.

5. The vehicle dispatch system according to claim 1, further comprising an error range estimation unit configured to estimate an error range of the user terminal position, wherein the superimposed image generation unit is configured to further superimpose the error range on the superimposed image.

6. An autonomous driving vehicle that provides a vehicle dispatch service in response to a vehicle dispatch request from a user, the autonomous driving vehicle comprising:

a recognition information acquisition unit configured to, by a sensor mounted in a dispatch vehicle as an autonomous driving vehicle to be dispatched, acquire surrounding environment recognition information as information of a surrounding environment of the dispatch vehicle;

a storage information acquisition unit configured to acquire surrounding environment storage information as information of the surrounding environment of the dispatch vehicle stored in advance;

a dispatch vehicle position estimation unit configured to estimate a dispatch vehicle position as a position of the dispatch vehicle based on a comparison of the surrounding environment recognition information with the surrounding environment storage information;

a user terminal position reception unit configured to receive a user terminal position as a position of a user terminal;

a pedestrian position estimation unit configured to estimate a pedestrian position, which is a position of a pedestrian around the dispatch vehicle, based on the surrounding environment recognition information;

a surrounding image generation unit configured to generate a surrounding image representing the surrounding environment of the dispatch vehicle based on the surrounding environment recognition information or the surrounding environment storage information;

a superimposed image generation unit configured to generate a superimposed image having the dispatch vehicle position, the estimated pedestrian position and the user terminal position superimposed on the surrounding image representing the surrounding environment of the dispatch vehicle; and an image transmission unit configured to transmit the superimposed image to the user terminal.

7. The autonomous driving vehicle according to claim 6, further comprising an error range reception unit configured to receive an error range of the user terminal position, wherein the superimposed image generation unit is configured to further superimpose the error range on the superimposed image.

8. A vehicle dispatch method that is executed by a vehicle dispatch system for an autonomous driving vehicle providing a vehicle dispatch service in response to a vehicle dispatch request from a user, the vehicle dispatch method comprising:

by a sensor mounted in a dispatch vehicle, which is the autonomous driving vehicle to be dispatched, acquiring surrounding environment recognition information, which is information of a surrounding environment of the dispatch vehicle;

acquiring surrounding environment storage information, which is information of the surrounding environment of the dispatch vehicle stored in advance;

estimating a dispatch vehicle position, which is a position of the dispatch vehicle, based on a comparison of the surrounding environment recognition information with the surrounding environment storage information;

estimating a user terminal position, which is a position of a user terminal;

estimating a pedestrian position, which is a position of a pedestrian around the dispatch vehicle, based on the surrounding environment recognition information;

generating a surrounding image representing the surrounding environment of the dispatch vehicle based on the surrounding environment recognition information or the surrounding environment storage information;

generating a superimposed image having the dispatch vehicle position, the estimated pedestrian position and the user terminal position superimposed on the surrounding image representing the surrounding environment of the dispatch vehicle; and displaying the superimposed image on the user terminal.

* * * * *